United States Patent [19]
Hance et al.

[11] 3,740,747
[45] June 19, 1973

[54] CROSS-CORRELATOR

[75] Inventors: Harold V. Hance, Palo Alto; Henry L. McCord, Los Angeles, both of Calif.

[73] Assignee: Hughes Aircraft Company, Culver City, Calif.

[22] Filed: Feb. 27, 1964

[21] Appl. No.: 348,898

[52] U.S. Cl. .................. 343/5 MM, 343/100 CL
[51] Int. Cl. ................................................. G01s 9/02
[58] Field of Search ............... 343/5, 100.7, 5 MM, 343/7.7, 8, 9, 100 CL; 235/181

[56] References Cited
UNITED STATES PATENTS

| | | | |
|---|---|---|---|
| 3,153,222 | 10/1964 | Fomenko | 343/100.7 |
| 3,157,874 | 11/1964 | Altar | 343/100.7 |
| 3,184,679 | 5/1965 | Kuehne | 343/100.7 |
| 3,192,522 | 6/1965 | Burtner | 343/5 |
| 3,211,898 | 10/1965 | Fomenko | 343/100.7 |

Primary Examiner—Benjamin A. Borchelt
Assistant Examiner—R. Kinberg
Attorney—James K. Haskell and Earnest F. Oberhein

EXEMPLARY CLAIM

1. A cross-correlator for processing signal data stored on film comprising, in combination, means for scanning said film with an electron beam; a reference signal; means for modulating said electron beam with said reference signed; means for focusing said modulated beam onto said film; signal forming means operatively disposed to develop information signals in response to energy from said beam penetrating said film; filter means coupled to said signal forming means for passing a predetermined portion of said information signal; and means coupled to said filter means for determining the integral of said portion.

13 Claims, 8 Drawing Figures

CROSS-CORRELATOR

This invention relates to synthetic array radars and more particularly to a cross-correlator for sequentially processing the recorded returns of targets illuminated by a coherent radar to develop a high resolution display.

A synthetic array radar of a type similar to the present invention is disclosed in a copending application entitled, "High Resolution Mapping System," Ser. No. 78,768, filed 27 Dec. 1960, by E. E. Herman and H. L. McCord, wherein it is stated that conventionally a very large antenna is required in order to obtain a high degree of azimuth resolution. However, an antenna mounted on an aircraft or other vehicle is limited in size by aerodynamic and other physical considerations. A synthetic array system that processes information received from a relatively small antenna so as to develop a synthetic antenna equivalent to a very large antenna would provide a high degree of angular resolution and be operable from high speed aircraft. A simplified and reliable mapping system that has a high degree of azimuthal resolution and that provides focusing at all ranges of interest so as to define small details of the area being mapped would be very advantageous to the art. In that, as in this application, Doppler signals from a coherent side-looking radar are recorded on a storage media and in turn scanned along successive range elements by an electron beam to develop Doppler history signals. These are then cross-correlated with a predetermined reference signal to discriminate against unwanted signal and noise components. The result is then used to develop a high resolution map.

In Herman et al., the Doppler history signals are cross-correlated in an electronic mixer with a linearly varying frequency from a reference-swept oscillator. In this invention, a similar linearly varying frequency from a stable reference oscillator is used but to modulate instead the scanning electron beam. The advantage of this is, namely, the elimination of one electronic component, specifically, the mixer used in the Herman et al, application. In addition, the reliability of an over-all system according to the invention is further enhanced and a significant reduction in system complexity is accomplished easing also the maintenance burden accordingly.

It is therefore an object of the present invention to provide an improved cross-correlator for a high resolution synthetic array radar processor.

It is another object of the invention to provide for a synthetic array radar processor a cross-correlator utilizing a modulated electron beam.

Another object of the invention is to provide a cross-correlator for a synthetic array radar processor wherein a predetermined reference signal is cross-correlated with the recorded Doppler histories of radar returns simultaneously as each range element of these histories is scanned by an electron beam.

Still another object of the invention is to provide a cross-correlator for a synthetic array radar processor in which the recorded signal history associated with the return in each range element is sequentially scanned and simultaneously cross-correlated with a reference signal superimposed upon the scanning electron beam.

It is further an object of the present invention to provide a cross-correlator for a synthetic array radar processor wherein the electron beam of the scan converter is modulated with a linearly varying frequency reference function at a rate dependent upon range as its electron beam sequentially scans the recorded Doppler histories associated with the returns on each successive range element.

In accordance with these and other features and objects of the invention, there is provided a cross-correlator for processing signal data stored on film comprising, in combination, means for scanning the film with an electron beam; means for modulating the electron beam with a variable frequency function; means for focusing the modulated beam onto the film; signal forming means operatively disposed to develop information signals in response to energy from the beam penetrating the film; filter means coupled to the signal forming means for passing a predetermined portion of the information signal; and means coupled to said filter means for determining the integral of that portion.

More specifically, there is provided a cross-correlator for processing stored bipolar video data to determine the cross-correlation integral between same and a programmed swept frequency reference signal, the stored data being in the form of film density variations representing Doppler frequency shifts versus time of targets within a predetermined range interval and extending in the range dimension across a film strip to form a line trace, successive ones of the line traces being spaced-apart in an azimuth direction along the film strip, the cross-correlator comprising, in combination, film transport means for carrying the film strip and including drive means for transferring the film strip to one of two spaced-apart cylinders at a predetermined rate; reading means including a flying spot scanner operatively disposed adjacent to the film transport means for scanning successive range elements in sequence through the range interval, the range elements each comprising a plurality of line traces; means for intensity modulating the electron beam of the flying spot scanner about a fixed bias level, the modulating means including means for generating the programmed swept frequency reference signal, oscillator means for developing a carrier signal, and means for developing a single-side band signal in response to the mixing of the reference and the carrier signals; optical means disposed intermediate one side of the film strip and the reading means for focusing the intensity modulated electron beam onto the film strip when same is scanned; signal forming means including a photomultiplier tube operatively disposed adjacent the other side of the film strip for developing an electrical signal in response to said beam penetrating the film strip; filter means including an output coupled to the signal forming means for rejecting all frequencies of the electrical signal other than those falling within a predetermined pass-band; and means coupled to the output for detecting and summing during each scanning sequence those frequencies of the electrical signal falling within the pass-band to determine the correlation.

In yet another aspect there is provided a synthetic array radar mapping system comprising coherent radar means for developing Doppler signals representative of position of an object to be mapped, recording means coupled to the radar means for storing the Doppler signals, reading means including a flying spot scanner coupled to the recording means to develop Doppler history signals, oscillator means coupled to the reading means for developing a frequency varying signal, means for intensity modulating the electron beam of the flying spot scanner with the frequency varying signal, signal forming means disposed adjacent to the reading means and responsive to energy received from the modulated electron beam to develop a correlation signal, filter means coupled to the signal forming means to pass a preselected band of frequencies of the correlation signal, means coupled to the filter means for developing the integral of the correlation signal, and map forming means coupled to the last-mentioned means for developing an indication of the object to be mapped.

The above and other features, objects and advantages of the present invention will appear from the following description of an exemplary embodiment thereof illustrated in the accompanying drawings wherein like characters refer to like parts and wherein.

Figures 1, 2:
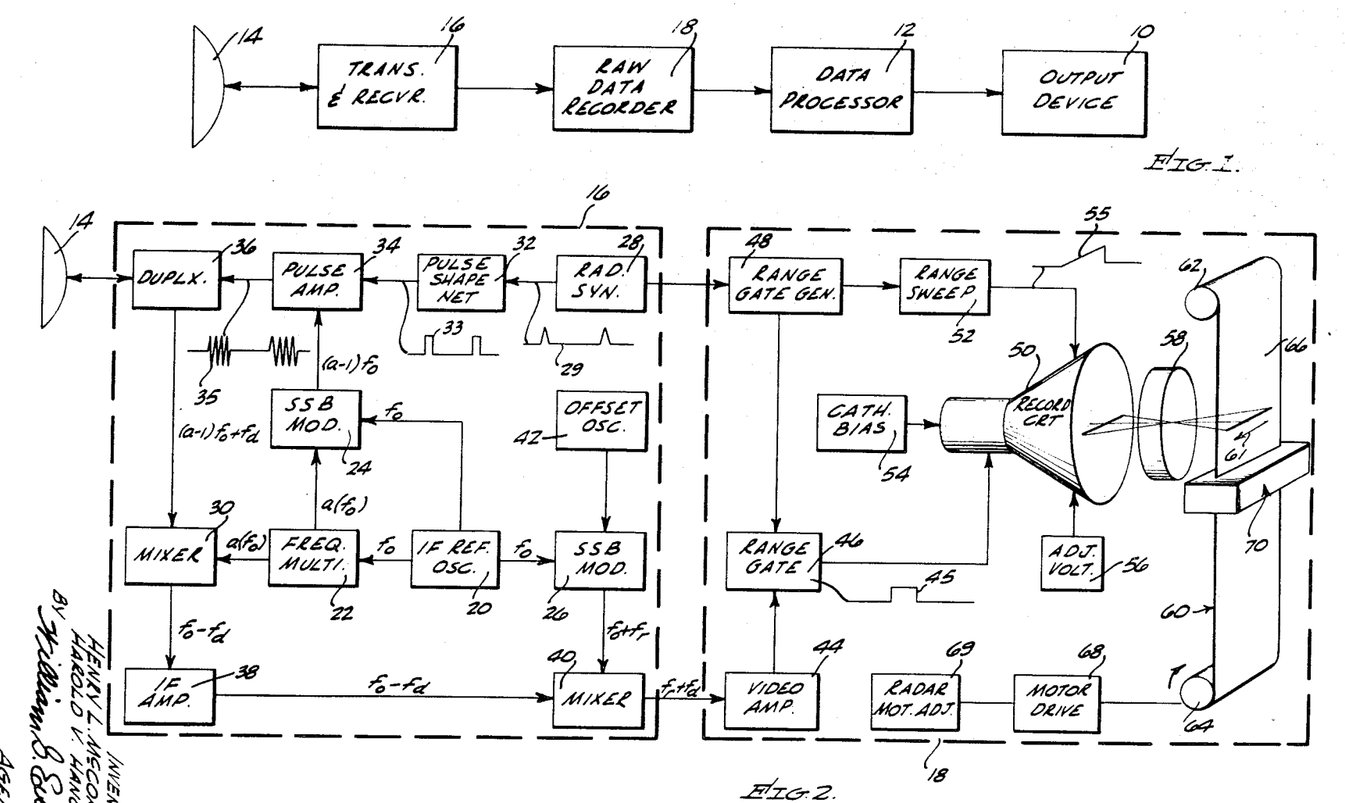
FIG. 1 shows a functional block diagram of a synthetic array radar system utilizing the cross-correlator of the present invention.
FIGS. 2 and 3 are detailed block diagrams of the synthetic array radar system of FIG. 1.

FIG. 1 shows a functional block diagram of a synthetic array radar system comprising an output device 10 and a radar data processor 12 in which a cross-correlator in accordance with the invention is provided for processing radar returns received from targets illuminated by an antenna 14 with coherent pulses developed by a transmitter-receiver 16 and recorded on a storage media included in a raw data recorder 18.

FIG. 2 shows a detailed block diagram of both the transmitter-receiver 16 and the data recorder 18 of FIG. 1. The transmitter-receiver 16 includes a reference oscillator 20 for generating an IF signal, $f_o$, which is fed to a frequency multiplier 22 and to single side band modulators 24 and 26. The output of the multiplier 22, $a(f_o)$, in turn is coupled to the modulator 24 and to a mixer 30. An RF signal, $(a-1)f_o$, is thus available at the output of the modulator 24.

A radar synchronizer 28 is also provided in the transmitter-receiver 16 for developing timing pulses having a waveform 29. A pulse shaping network 32 squares the waveform 29 and this square wave 33 is used to gate a pulse amplifier 34 to which the RF signal, $(a-1)f_o$, is coupled. The output of the pulse amplifier 34 is a pulsed RF carrier, shown in FIG. 2 as waveform 35. This pulsed carrier is coupled to the antenna 14 through a duplexer 36 and radiated in a known direction into space.

Radar returns from those targets illuminated by the directional antenna 14 are fed through the duplexer 36 to the mixer 30 and include the RF carrier, $(a-1)f_o$, and a Doppler shift frequency, $f_d$. At the mixer 30, the output of the multiplier 22, $a(f_o)$, is heterodyned with the radar returns, $(a-1)f_o + f_d$, resulting in a signal containing the IF signal and the Doppler shift frequency, namely, $f_o - f_d$. The output of the mixer 30, $f_o - f_d$, may be amplified first, as in amplifier 38, before being applied to a mixer 40.

The mixer 40 also receives another composite signal comprising the IF signal, $f_o$, and a reference offset frequency, $f_r$. The former $f_o$ portion is supplied by the reference oscillator 20 and the latter $f_r$ portion by an offset oscillator 42, both portions being combined by the modulator 26. The bipolar video output signal of the mixer 40, $f_r + f_d$, and the timing pulses from the synchronizer 28 comprise the output of the transmitter-receiver 16 that is coupled to the data recorder 18, reference FIGS. 1 and 2.

A video amplifier 44 is provided in the data recorder 18, reference FIG. 2, to amplify the bipolar video signal received from the mixer 40. This amplified video signal is applied through a range gate 46 to the beam intensity grid of a record scanning tube 50 which may be a conventional cathode ray tube preferably of the electrostatic deflection type. A range gate generator 48 receives the waveform 19 from the radar synchronizer 28 and in response thereto actuates the range gate 46 during a finite time interval within each interpulse period, reference waveform 45. Only video signals applied to the range gate 46 during the time interval represented by the waveform 45 are transmitted to the intensity grid of the scanning tube 50. Conversely, video signals from targets other than those within the ranges which this time interval represents are rejected by the range gate 46.

A range sweep generator 52 is also provided for deflecting the electron beam of the record scanning tube 50 at the proper time and rate, as for example by a ramp input 55, when appropriately triggered by the range gate generator 48. Voltage sources 54 and 56 are also provided for respectively controlling both the intensity and the position of the electron beam of the record scanning tube 50.

The data recorder 18 also includes a film transport mechanism 60 comprising spaced-apart film carrying cylinders 62 and 64. A motor drive 68 is coupled to the cylinder 64 to transport a strip of film 66 passed the record scanning tube 50 so that the bipolar radar video may be imaged onto the light sensitive film. A motor controller or radar motion adjust device 69 may be provided to control the speed of the film 66 as desired. A film processing unit 70 is also provided to develop the film 66 directly after its exposure. A more detailed description of the data recorder 18 is presented in the above-mentioned copending application filed by Herman et al.

Figures 3, 4, 5:
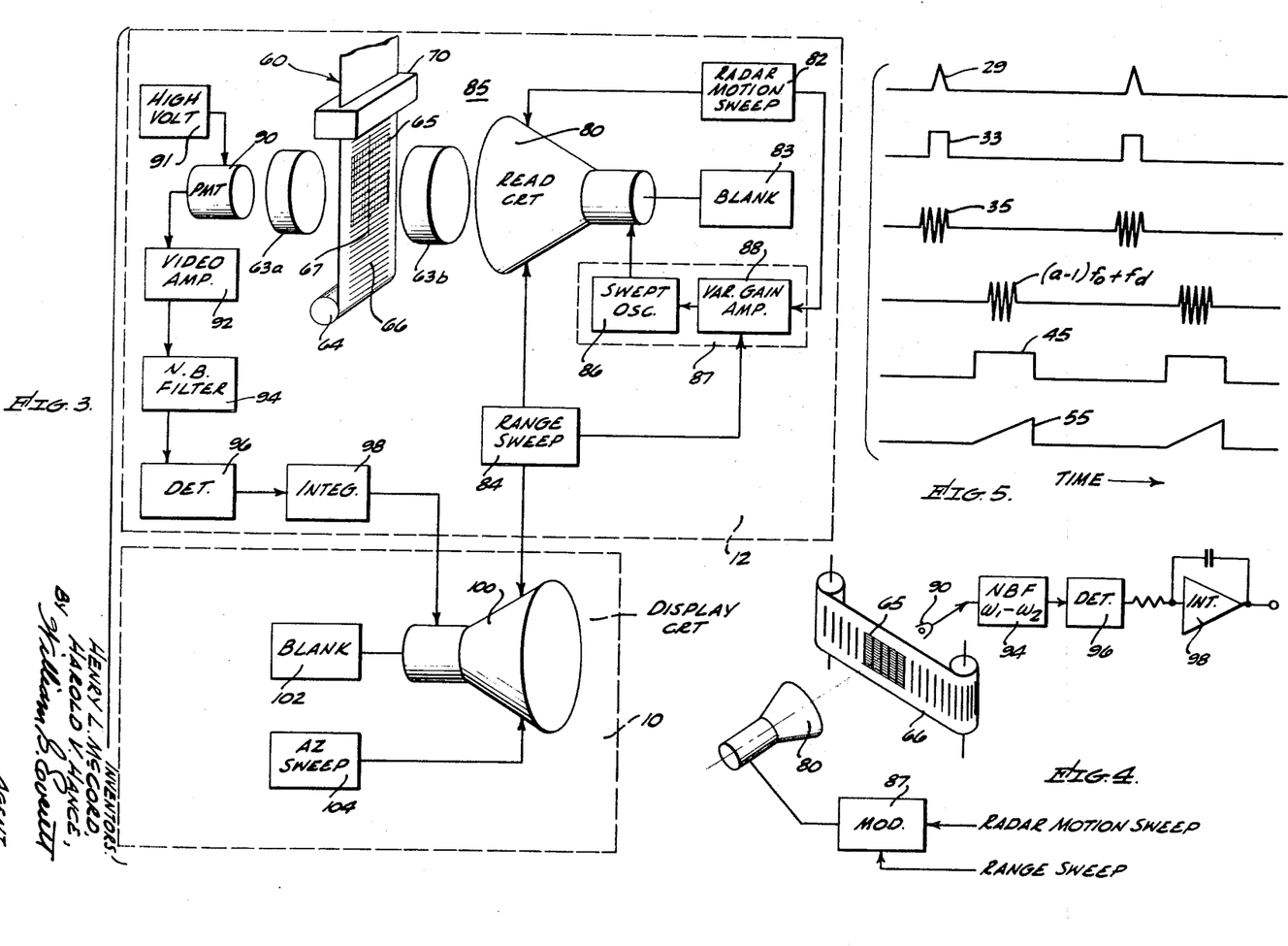
FIG. 4 comprises a simplified block diagram of a cross-correlator in accordance with the present invention.
FIGS. 5 and 6 illustrate the time relationship of selected waveforms useful in describing the invention.

The data processor 12, reference FIG. 3, includes a flying spot scan-converter 85 comprising a read scanning tube 80 mounted adjacent to and facing one side of the film 66 and a photomultiplier tube 90 mounted on the other side of the film 66 preferably in axial alignment with the read scanning tube 80. Conventional lenses 63a and 63b may be provided for focusing purposes.

The electron beam of read scanning tube 80 is deflected in both a longitudinal direction along the film strip 66 by a radar motion sweep generator 82 and in a transverse direction across to the film strip 66 by a range sweep generator 84. The output of a voltage controlled swept oscillator 86 is applied to the beam intensity grid of the read scanning tube 80 to intensity modulate the electron beam with a linearly varying frequency signal. A variable gain amplifier 88 provides the driving voltage for the voltage controlled swept oscillator 86.

It is this linearly varying frequency signal from the voltage controlled swept oscillator 86 that constitutes the reference function with which the Doppler history signal stored on the film 66 is cross-correlated.

Consider, for a moment, a read scanning beam of constant intensity scanning a TV-like raster or reading frame 65 and, in particular, scanning a typical range element 67 thereof. That energy which penetrates the film 66 in the form of intensity modulated light and is received by the photomultiplier tube 90 is thereupon converted to an electrical voltage the amplitude variations of which represent the Doppler history signal over the scanning time interval for a range represented by the range element 67. By now scanning the same range element 67 with an electron beam intensity modulated in accordance with the output of the voltage controlled swept oscillator 86, the energy received and converted at the photomultiplier tube 90 represents the cross-product or multiplication of the Doppler history signal for that range and the corresponding referenced frequency function. This scanning and multiplying process is repeated in sequence for each of the range elements forming the reading frame 65 and for all successive reading frames as well.

It is pointed out that the slope of the reference frequency function must be varied accordingly with range if all-range focusing and the attendant high resolution is to be realized. This stems from the fact that the slope of the Doppler shift frequency versus time is not independent of range. At close range, for example, the slope is steeper than at distant ones.

In FIG. 3, the output of the variable gain amplifier 88 is a linearly varying voltage of the proper slope for each range element which, when applied to the voltage controlled swept oscillator 86, will result in its developing a signal commencing initially with a first predetermined frequency and thereafter decreasing linearly to a second predetermined frequency, all within the time necessary to scan the instant range element.

By varying the frequency at the beginning and/or at the end of this scanning time interval accordingly, the slope of the reference signal may be adjusted as desired to that which, at any particular range, the slope of the Doppler shift as computed will be when the corresponding targets are illuminated by the antenna beam. To this end, the radar motion sweep generator 82 develops a ramp function which is modified accordingly by a signal from the range sweep generator 84 representing instantaneous range information. It is this ramp function and range information that the variable gain amplifier 88 receives and in response thereto develops the desired driving voltage for the voltage controlled swept oscillator 86.

The photomultiplier tube 90 and its source of high voltage 91 provide the means for converting, to an analogous electrical signal, the time varying intensity modulated light that penetrates the film 66 and impinges onto the photomultiplier tube 90. This electrical signal, representing the cross-product pointed out supra, may first be amplified by a video amplifier 92 before being filtered by a narrow band filter 94 to remove the unwanted signal and/or noise components. The center frequency of the filter 94 is preselected, preferably to equal the difference in frequency between the reference frequency function and the corresponding stored Doppler history. Note, the sum frequency may be used, if desired; a full explanation follows in conjunction with FIGS. 7 and 8.

The output of the filter 94 is amplitude detected in a conventional manner by a detector 96. The integral of the product, or the cross-correlation integral, is then developed by an integrator 98 and employed to drive the output device 10 which may include a display cathode ray tube 100 of the type used in connection with the strip map recorder disclosed in the above-mentioned Herman et al, application. For mapping purposes, the film transport mechanism 60 of FIG. 2 in conjunction with the film processing unit 70 would also suffice provided the film speed were adjusted appropriately according to the speed of the moving radar.

In FIG. 3, the electron beam of the display tube 100 is deflected in the range dimension by the range sweep generator 84 and is blanked during retrace and positioned as necessary in the azimuth dimension, respectively, by a conventional blanking circuit 102 and an azimuth sweep positioning circuit 104.

To summarize briefly at this point, the sweep generators 82 and 84 drive the conventional deflection circuits of the read scanning tube 80, reference FIGS. 3 and 4. At the same time, range and azimuth information in a suitable form are supplied to a modulator 87 to develop the previously mentioned reference function, a linearly varying frequency signal which, ignoring the d-c component, may be expressed as $y(t) \cos\omega_1 t$. The modulator 87 may comprise the voltage controlled swept oscillator 86 and the variable gain amplifier 88 of FIG. 3. Thus, as the modulated electron beam scans successive reading frames 65 made up of many such typical range elements 67, the intensity modulated light which has penetrated the film strip 66 and has been received at the photomultiplier tube 90 is there converted to an electrical signal. This signal, it is remembered, is an analog of the cross-product between the above-mentioned reference frequency function, $y(t) \cos\omega_1 t$, and the stored Doppler history, $x(t) \cos\omega_2 t$.

The output of the photomultiplier tube 90 is a complex signal containing the product, sum and difference frequencies, and multiples thereof, of the angular frequencies $\omega_1$ and $\omega_2$ as well as some d-c component. However, the unwanted signal and noise components including this d-c component are rejected by the narrow-band filter 94; only a desired band of frequencies, for example, the difference frequency between $\omega_1$ and $\omega_2$ shown in FIG. 4, is passed to be enveloped directed at the detector 96. From this detected signal, the integrator 98 develops the correlation integral which is then employed to drive the display tube 100 in a customary manner.

Figure 8:
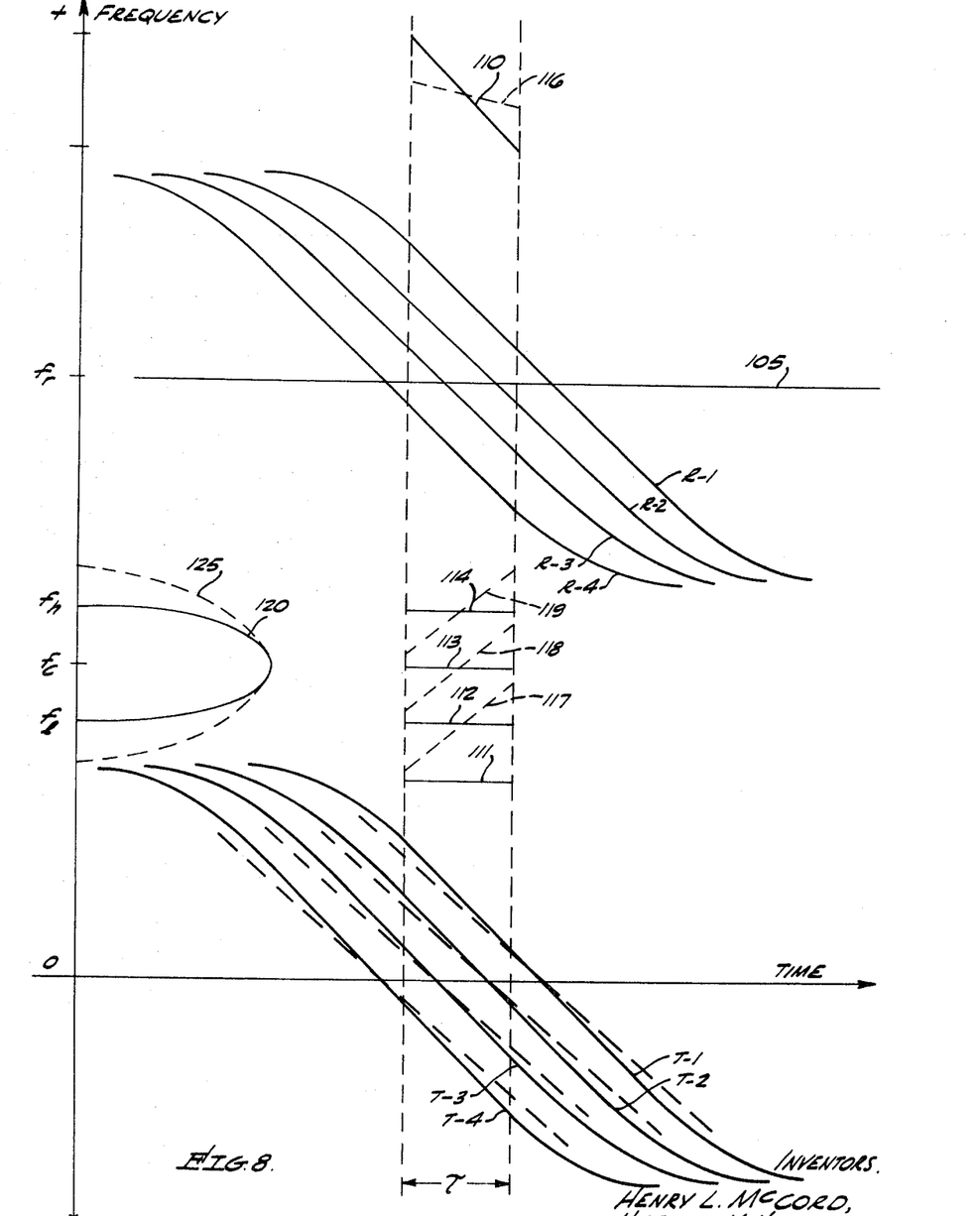
FIG. 8 shows a series of waveforms also useful in describing the invention.

It is pointed out that this converting, filtering, detecting and integrating process is completed for each range element of each reading frame during each scanning time interval $\tau$, reference FIG. 8.

In FIG. 5, selected waveforms of those set forth hereinabove are referenced to a common time base to graphically illustrate their interrelationship. Specifically, FIG. 5 indicates that the electron beam of the record scanning tube 50 is range deflected, during the gated time interval depicted by the waveform 45, by the ramp input 55 to scan across the film strip 66 in preferably a direction as shown by an arrow 61, reference FIG. 2. Furthermore, FIG. 5 indicates that only those radar video signals existing during this gated interval are employed to intensity modulate the record scanning electron beam.

Figure 6:
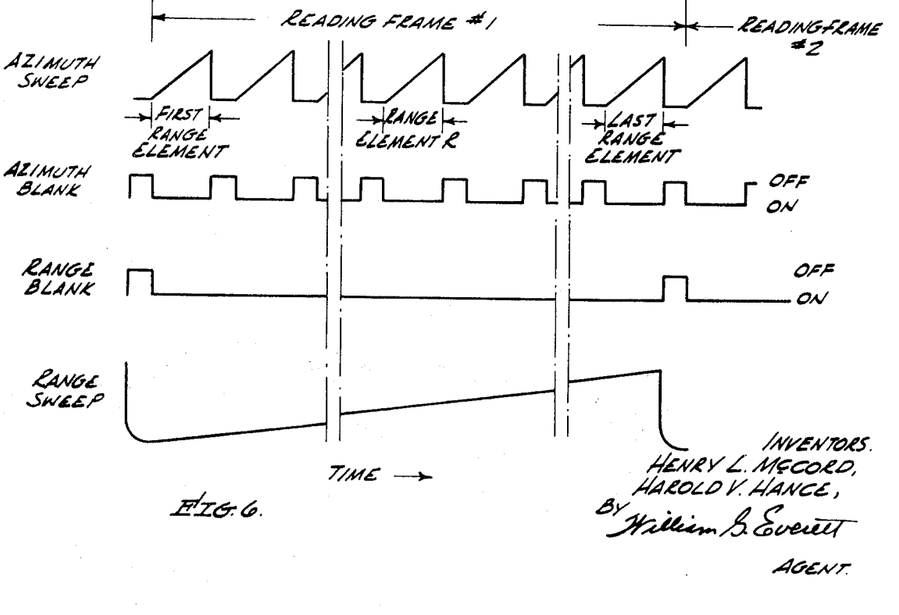

The radar motion or azimuth sweep and the range sweep waveforms for driving the read scanning tube 80 together with the corresponding blanking waveforms are shown in FIG. 6 similarly referenced to a common time base. Thus, between successive range element sweeps, the read scanning electron beam is deflected in the range dimension an equivalent of one range resolution. Upon scanning through the entire range interval, the process is repeated; this time, a new raster frame is formed, one of which the oldest range trace is excluded and included in its place is the range trace immediately following the most recently included one. A complete explanation of this scanner-converter operation is set forth in the above-referenced Herman et al., application.

Figure 7:
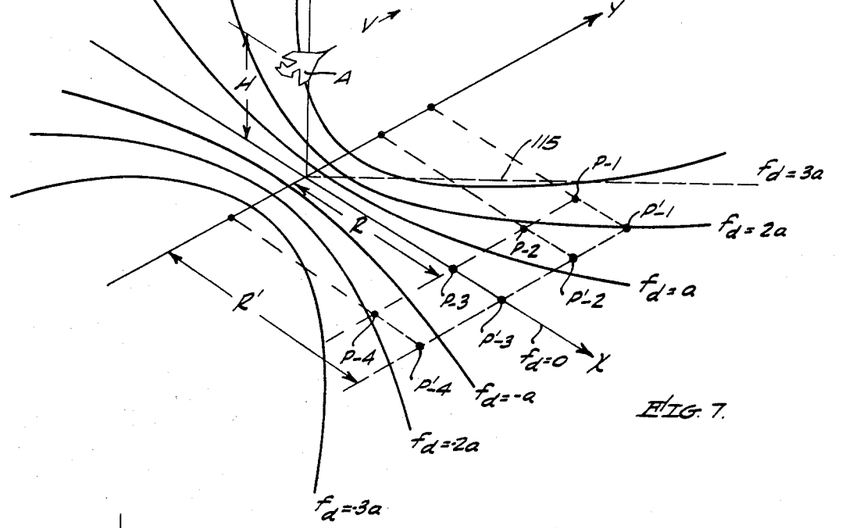
FIG. 7 shows a family of curves representing Doppler shift frequencies projected on the X-Y plane and serves to facilitate an operational description of the invention.

In FIG. 7, there is shown the family of Doppler shift frequency curves, $f_d = 3a$ decreasing through zero to $f_d = -3a$. Such a family of curves is associated with an aerospace vehicle A (carrying a coherent side-looking pulsed radar) flying at an altitude H in the Y direction at a speed V. This stems from the fact that during the interval when a target such as P–1 or P–2 is illuminated by the radar antenna the distance to such a target decreases in time at a varying rate; in other words, the line of sight to it rotates relative to the flight path Y. In FIG. 7, the rotation is clockwise, Therefore, due to the relative motion between the vehicle A and the target illuminated, each echo therefrom undergoes a Doppler frequency shift, one in which the frequency decreases substantially linear with time. This is shown graphically in FIG. 8. For targets disposed at positions P–1, P–2, P–3, and P–4 in FIG. 7, the respective frequency versus time characteristics are depicted by the traces T–1 through T–4, FIG. 8. At an increased range R', the slope of these curves decreases as shown by the accompanying dotted delineations. For a target at a more distant range, the rate of change of the distance to the target relative to its range is less than that for a target at close range. Note, the angle between a target at P'–1 and the X axis in FIG. 7 is less than a similar angle for a target at P–1.

Stated in terms of phase instead of Doppler, the echo phase from a target such as P–1 at a particular range R in FIG. 7 slowly rotates over a number of successive pulse returns as the target distance decreases or, in other words, as the target in time advances to relative position P–2 through the beam center at P–3 to P–4. During any one pulse, however, the amount of phase rotation is negligible; hence, the output of the radar receiver for a particular target, say P–1, appears in the form of bipolar video pulses. It is this bipolar pulse train or Doppler history associated with each range element that is operated on by the data processor 12 to form a continuous and all-range-focused synthetic array.

Note that in FIG. 8 each of the traces T–1 through T–4 passes through zero frequency meaning that the frequency of the target return decreases substantially linearly from slightly above the transmitted pulsed carrier for a target recently illuminated to precisely the carrier frequency when the target passes through the beam center to less than carrier frequency just prior to the target's leaving the illuminated area. To avoid this passing through zero frequency, the antenna beam may be squinted to some angle other than 90°, say 45° relative to the flight path Y as shown by a dotted line 115 in FIG. 7 or a frequency offset, $f_r$, as used herein and described in conjunction with the transmitter-receiver 16 may be provided and the orthogonally directed beam relative to the flight path Y retained.

It is remembered that this offset frequency, shown in FIG. 8 by a horizontal line 105 at frequency $f_r$, is so chosen that when added to the traces T–1 through T–4 the resultant frequency swing always remains positive as the traces R–1 through R–4, respectively, indicate. It is pointed out that the traces R–1 through R–4 may be interpreted to represent at each instant the radar video as recorded on the film strip 66 for the particular range, namely R. Moreover, the traces R–1 through R–4 also represent the stored Doppler history for that range element. Stated differently, the traces R–1 through R–4 would represent the Doppler history signal which the photomultiplier tube would receive in the form of intensity modulated light and would convert to an electrical signal if the electron beam of the read scanning tube 80 were not intensity modulated by the linearly varying frequency output of the modulator 87.

This reference frequency function is graphically described in FIG. 8 by a linear trace 110. Among the various frequency components present in the photomultiplier output as a result of mixing the traces R–1 through R–4 each with the trace 110 is the difference frequency, shown in FIG. 8 by the curves 111 through 114, respectively.

Assume for descriptive purposes that the amplitude versus frequency characteristics of the filter 94 are as shown by a curve 120. Under this condition, then, all frequencies other than those within this pass-band centered about $f_c$ and hence the curve 113 are rejected by the filter 94. By altering the parameters of the filter 94 accordingly, the center frequency $f_c$ may be shifted, for example, upwardly to $f_h$ or downwardly to $f_l$, to pass a bandwidth of frequencies centered respectively about the curves 114 or 112.

This means that of the many targets that may have been illuminated by the real antenna of a pulsed side-looking radar only radar returns from a portion of these targets, a portion that lies within a small narrow and adjustable zone on either side of the real antenna beam center, will, when processed, contain the necessary frequency components, those falling within the pass-band of the filter 94. In other words, within the real antenna beam pattern there is another intermediate beam which is attributable to the synthetic array generated by the very manner in which the Doppler histories are heterodyned, offset, recorded, read-out, and correlated.

The pattern of this intermediate or synthetic array beam may be made very narrow by decreasing, for example, the bandwidth of the filter 94. This is readily seen in FIG. 8 by pointing out that the inverse is true, namely, by increasing the bandwidth to that shown by a dotted curve 125, then in addition to returns for the targets at P–3 as seen in FIG. 7 and represented by the curve 113 in FIG. 8, returns from targets located at P–2 and P–4, although to a lesser extent, will also result, when read-out by the scan/converter 85, in difference frequencies falling within the bandpass of the filter 94. Thus, increasing the bandwidth of the filter 94 decreases azimuth resolution; the inverse is also true up to a point where the interval is insufficient to permit an adequate output for the filter 94.

Note also that the beam pointing direction of the synthetic beam may be changed simply by shifting, for example, the curve 120 upwardly to center on $f_h$ in which event, the synthetic beam center will pass through targets at relative position P-4. In a similar manner, the synthetic beam may be directed to pass through P-2 by shifting the curve 120 so that its center frequency equals the difference frequency represented by the curve 112.

It is to be noted that as time passes, a target, say located at P-1, slowly migrates through the real antenna beam taking up positions P-2, P-3, P-4, etc. In the meantime, Doppler returns for this target are recorded and processed resulting in difference frequencies represented by the curves 111 through 114, which curves may be construed to be also advancing or migrating in frequency through the pass-band of the filter 94. When the target was located at P-3, the output of the filter 94 was maximized since the difference frequency is then equal to the center frequency of the pass-band. This means that the detected output would be maximal as would the output of the integrator 98 which drives the output device 10. Were a map to be made of these objects, then with time converted to azimuth a target would be indicated at a range R along a line which is at a right angle to the flight path Y of the vehicle A.

It is remembered that the slope of the reference frequency function must be varied with range and equal the slope of the Doppler history if maximum azimuth resolution is to be attained. This can be seen clearly in FIG. 8. Consider a reference function in which the linear varying frequency decreases as shown by a trace 116. When the trace R-3 representing the Doppler history signal for targets at range R during the scanning time interval is mixed with the trace 116, the difference frequency component is as shown by a curve 118. It is obvious that the output of filter 94 is less than maximum during the interval when a signal applied thereto is sweeping through frequencies as shown by the curve 118 rather than as shown by the curve 113. Furthermore, when either the trace R-2 or R-4 is mixed with the trace 116, the resulting difference component is as seen by the trace 117 and 119, respectively. Note, the higher frequencies of the trace 117 as do the lower frequencies of the trace 119 spill over into the bandpass of the filter 94, see curve 120. What this means is that targets located at positions P-2 and P-4, respectively, will be seen along with the target at P-3 and will appear in the output of the data processor 12. In other words, the azimuth resolution of the mapping system has been reduced. Such a reduction is avoided by using the proper reference frequency function for each range, a function whose slope parallels that of the Doppler history for the corresponding range. Stated differently, the effect of cross-correlating the Doppler histories with a nonoptimal reference function in effect broadens the synthetic array beam which in turn results in decreased azimuth resolution.

A scan converter storage tube may also be used as the intermediate storage medium in place of the storage film 66 and its associated film transport mechanism 60. A suitable storage tube for such a replacement is the type CK7702 scan converter dual gun storage tube as manufactured by Raytheon.

Thus, there has been shown and described an improved cross-correlator for a high resolution synthetic array radar processor. By modulating the electron beam of a scan converter in the manner provided, the complexity of the processor is reduced and its reliability enhanced. While only a preferred embodiment of the invention has been set forth, others may be made without departing from the intended scope of the invention, the purpose here being primarily descriptive and not limiting in any sense.

What is claimed is:

1. A cross-correlator for processing signal data stored on film comprising, in combination, means for scanning said film with an electron beam; a reference signal; means for modulating said electron beam with said reference signal; means for focusing said modulated beam onto said film; signal forming means operatively disposed to develop information signals in response to energy from said beam penetrating said film; filter means coupled to said signal forming means for passing a predetermined portion of said information signals; and means coupled to said filter means for determining the integral of said portion.

2. A cross-correlator for processing radar video data stored on film comprising, in combination, means for providing an electron beam, said means operatively disposed to project said beam upon said film; means for deflecting said beam; a reference signal, means for modulating said beam with said reference signal; means for focusing said modulated beam on said film; photomultiplier means operatively disposed to develop a voltage signal in response to energy passing through said film from said beam; filter means coupled to said photomultiplier means for passing a predetermined band of frequencies of said voltage signal; and means coupled to said filter means for determining the integral of said voltage signal falling within said frequency band.

3. A cross-correlator for processing radar video data stored on film as a function of range in the form of line traces extending across a film strip comprising, in combination, means for scanning a plurality of said line traces in a direction along said film strip with an electron beam; means for modulating said electron beam with a reference signal; optic means for focusing said modulated electron beam as same scans said film strip; signal forming means operatively disposed adjacent said film strip and adapted to receive that energy from said beam which penetrates said film strip to develop information signals in response thereto; filter means electromagnetically coupled to said signal forming means for rejecting all frequencies of said information signal other than those falling within a predetermined passband; and means including detecting and integrating means coupled to said filter means for determining the output of said filter means, said integral being indicative of the alignment of said stored radar video data with that programmed and represented by said reference signal.

4. A cross-correlator for processing stored bipolar video data to determine the correlation between same and certain reference data, said stored data being in the form of film density variations extending in the range dimensions across a film strip to form a line trace, successive ones of said line traces being spaced apart in an azimuth direction along said film strip, said cross-correlator comprising, in combination, film transport means for carrying said film strip and including drive means for transferring said film strip to one of two spaced-apart film containers at a predetermined rate; reading means operatively disposed adjacent to said film transport means for sequentially scanning a plurality of said line traces with an electron beam over said range dimension; modulating means coupled to said reading means for intensity modulating said electron beam with a reference signal; optical means disposed intermediate one side of said film strip and said reading means for focusing said intensity modulated electron beam onto said film strip during the scanning sequence; signal forming means operatively disposed adjacent the other side of said film strip for developing an information signal in response to beam energy penetrating said film strip; filter means including an output coupled to said signal forming means for rejecting all frequencies of said information signal other than those falling within a predetermined pass-band; and means coupled to said output for detecting and summing the output signal of said filter means during each scanning sequence to determine said correlation.

5. A cross-correlation for processing radar video data stored as a function of range across a film strip in the form of line traces comprising, in combination, film transport means for supporting said film strip and including means for transferring same from one to the other of two spaced-apart cylinders at a predetermined rate; reading means juxtapositioned adjacent to said film transport means and including means for scanning a plurality of line traces in a direction along said film strip with an electron beam during a time interval; modulating means coupled to said reading means for intensity modulating said electron beam with a reference signal and including means for varying the frequency of said reference signal as a function of range; optical means disposed intermediate one side of said film strip and said reading means for focusing said intensity modulated electron beam onto said film strip; signal forming means including a photomultiplier tube operatively disposed adjacent the other side of said film strip for developing an electrical signal in response to beam electrons penetrating said film strip; filter means including an output electromagnetically coupled to said signal forming means for rejecting all frequencies of said electrical signal other than those falling within a predetermined pass-band; and means coupled to said output for detecting and summing the output signal of said filter means during said time interval to determine the cross-correlation integral at the end thereof, the instantaneous amplitude of said integral being indicative of the degree of correlation between the stored data and that represented by said reference signal.

6. In a synthetic array data processing system for developing a high resolution display of objects located within an area to be mapped where said system includes coherent radar means operable from a moving craft for providing Doppler shift signals representative of the position of said objects and means for recording said Doppler shift signals on film comprising record scanning means including means for modulating the electron beam thereof with said Doppler shift signal to record same on said film, a cross-correlator device for said processing system comprising, in combination, read scanning means for scanning a plurality of said stored Doppler shift signals for each range successively to develop Doppler history signals for each of said ranges, said read scanning means including means for modulating the electron beam thereof with a reference signal; signal forming means optically coupled to said read scanning means for receiving substantially all of the energy passing through said film from said modulated electron beam to develop a response signal, said film being operatively disposed intermediate said read scanning means and said signal forming means; filter means electromagnetically coupled to said signal forming means for rejecting all frequencies of said response signals other than those within a predetermined pass-band; and means operatively responsive to said pass-band frequencies for developing a display signal, the amplitude variations thereof representing the degree of correlation between the recorded data and that represented by said referenced signal.

7. A cross-correlator for processing stored bipolar video data to determine the cross-correlation integral between same and a programmed swept frequency reference signal, said stored data being in the form of film density variations representing Doppler frequency shifts versus time of targets within a predetermined range interval and extending in the range dimensions across a film strip to form a line trace, successive ones of said line traces being spaced-apart in an azimuth direction along said film strip, said cross-correlator comprising, in combination, film transport means for carrying said film strip and including drive means for transferring said film strip to one of two spaced-apart cylinders at a predetermined rate; reading means including a flying spot scanner operatively disposed adjacent to said film transport means for scanning successive range elements in sequence through said range interval, said range elements each comprising a plurality of line traces; means for intensity modulating the electron beam of said flying spot scanner about a fixed bias level, said modulating means including means for generating said programmed swept frequency reference signal, oscillator means for developing a carrier signal, and means for developing a single-side band signal in response to the mixing of said reference and said carrier signals; optical means disposed intermediate one side of said film strip and said reading means for focusing said intensity modulated electron beam onto said film strip when same is scanned; signal forming means including a photomultiplier tube operatively disposed adjacent the other side of said film strip for developing an electrical signal in response to electrons penetrating said film strip; filter means including an output coupled to said signal forming means for rejecting all frequencies of said electrical signal other than those falling within a predetermined pass-band; and means coupled to said output for detecting and summing during each scanning sequence those frequencies of said electrical signal falling within said pass-band to determine said correlation.

8. In a synthetic array data processing system for developing a high resolution display of objects located within an area to be mapped where said system includes coherent radar means operable from a moving craft for providing Doppler shift signals representative of the position of said objects and means for recording said Doppler shift signals on film comprising record scanning means including means for modulating the electron beam thereof with said Doppler shift signal to record same on said film, a cross-correlator device for said processing system comprising, in combination, read scanning means for scanning a plurality of said stored Doppler shift signals for each range successively to develop Doppler history signals for each of said ranges, said read scanning means including means for modulating the electron beam thereof with a reference signal; signal forming means optically coupled to said read scanning means for receiving substantially all of the light passing through said film to develop a difference signal, said film being operatively disposed intermediate said read scanning means and said signal forming means; filter means electromagnetically coupled to said signal forming means for rejecting all frequencies of said difference signals other than those within a predetermined pass-band; and means operatively responsive to said pass-band frequencies for developing a display signal, the amplitude variations thereof representing the degree of correlation between the recorded data and that represented by said reference signal.

9. The cross-correlator in accordance with Claim 8 wherein said read scanning means further includes means for varying the reference signal frequency as a function of range.

10. A synthetic array radar mapping system comprising coherent radar means for developing Doppler signals representative of position of an object to be mapped, recording means coupled to said radar means for storing said Doppler signals, reading means including a flying spot scanner coupled to said recording means to develop Doppler history signals, oscillator means coupled to said reading means for developing a frequency varying signal, means for intensity modulating the electron beam of said flying spot scanner with said frequency varying signal, signal forming means disposed adjacent to said reading means and responsive to energy received from said modulated electron beam to develop a correlation signal, filter means coupled to said signal forming means to pass a preselected band of frequencies of said correlation signal, means coupled to said filter means for developing the integral of said correlation signal, and map forming means coupled to said last-mentioned means for developing an indication of the object to be mapped.

11. A synthetic array radar mapping system operable from a craft moving relative to objects in a range interval from the craft comprising a coherent pulsed radar means mounted on the craft for illuminating the objects and receiving Doppler signals therefrom as the craft moves; recording means coupled to said radar means for storing the Doppler signals in the form of successive range traces; reading means including an electron beam for scanning a plurality of range traces in a direction orthogonal thereto in the form of range elements, said plurality defining the length of said synthetic array; means coupled to said reading means including oscillator means for developing a frequency varying signal and means for modulating said electron beam with said frequency varying signal; means coupled to said reading means for deflecting said modulated electron beam to sequentially sample the Doppler history signals stored in each successive range element; signal forming means including a photoelectric device disposed adjacent to said recording means and in axial alignment with said reading means, said photoelectric device being operatively responsive to energy received from said modulated electron beam in the form of intensity modulated light to convert same to an analogous electrical correlation signal; filter means coupled to said photoelectric device for rejecting all frequency components of said correlation signal other than a predetermined band of frequencies; means responsive to said band of frequencies for developing the cross-correlation integral during the time interval said modulated electron beam scans each of said range elements; and display means coupled to said integral developing means for providing an indication of said objects.

12. A synthetic array radar processing system for providing focused mapping of objects in a fixed range interval opposite a moving craft in response to Doppler signals recorded on an intermediate film strip in the form of line traces of film density variations extending in the range dimension across said film strip, the frequency and time occurrence of said Doppler signals and of said film density variations being representative of positions of said objects resolvable within said range interval, said radar processing system comprising reading means including a flying spot scanner operatively disposed adjacent said film strip for sequentially scanning a plurality of said line traces in the form of successive range elements through said range interval to develop corresponding Doppler history signals; means for intensity modulating the electron beam of said flying spot scanner with a linearly varying frequency signal about a fixed bias level as said electron beam scans each range element, said modulated means including a voltage controlled swept oscillator for developing said linearly varying frequency signal, a variable gain amplifier for developing a time varying control voltage to drive said swept oscillator and sweep generators for deflecting said modulated electron beam and for driving said variable gain amplifier to develop said control voltage; signal forming means including a photomultiplier tube operatively disposed adjacent said film strip on a side thereof opposite said reading means and in axial alignment therewith to receive that energy from said modulated electron beam which penetrates said film strip in the form of intensity modulated light, said photomultiplier tube developing in response to said light an electrical correlation signal representative of the cross-correlation function between said linearly varying frequency function and the Doppler history signal for the respective range element; filter means coupled to said signal forming means rejecting all frequency components of said electrical correlation signal other than a predetermined pass-band; means coupled to said filter means and responsive to said pass-band of frequencies for developing the integral thereof over the time interval said modulated electron beam scans each range element; and display means coupled to said last-mentioned means to provide an indication of said objects.

13. A synthetic array radar mapping system for providing focused mapping of objects in a range interval opposite a moving craft comprising coherent side-looking radar means having an antenna mounted on the side of said craft for illuminating objects disposed within said range interval with a pulsed radio frequency carrier and for obtaining Doppler returns from those objects illuminated, said Doppler returns varying in frequency and having a zero frequency whenever a resolvable object is opposite said craft; oscillator means coupled to said radar means for frequency offsetting said Doppler returns so that said zero frequency is at a selected frequency; an intermediate storage film including means for moving said film at a predetermined velocity; a record scanning tube coupled to said radar means and to said offset oscillator means, said record scanning tube including an electron beam; gate means coupled to said radar means and to said record scanning tube for sweeping the electron beam thereof across said film in range synchronism with said Doppler returns; means including biasing means coupled to said record scanning tube for intensity modulating the electron beam thereof in accordance with the instantaneous amplitude of said Doppler returns; means for imaging onto said storage film energy in the form of intensity modulated light in accordance with said modulated electron beam in the form of successive parallel range traces; a read scanning tube mounted adjacent to said storage film and including an electron beam; sweep generator means coupled to said read scanning tube for developing first and second sweep signals, the electron beam of said read scanning tube being deflected according to range by said first sweep signal to sequentially scan a portion of said range trace recordings in a direction such that all targets of the same range are scanned successively forming successive range elements, the electron beam of said read scanning tube also being deflected in the range dimension one range resolution after scanning each of said range elements, said first and second sweep signals being further combined so that said read scanning beam sequentially sweeps through successive reading frames each comprising a like number of range traces forming said scanned portions, the scanning of successive frames being commenced in response to the scanning of that range element of the previous reading frame which represents the farthest range; variable gain amplifier for developing a linearly varying voltage in response to said first sweep signal, said amplifier including means for varying the slope of said varying voltage as a function of range in response to said second sweep signal; voltage controlled swept oscillator coupled to said read scanning tube for intensity modulating the electron beam thereof with a reference signal comprising linearly varying frequency in response to said voltage from said amplifier; photomultiplier means mounted adjacent to said intermediate storage film in axial alignment with said read scanning tube for receiving energy from the modulated electron beam thereof in the form of intensity modulated light penetrating said film during each range element, said photomultiplier means being responsive to said light for developing correlation signals having frequency components related to the scanned portion of said stored Doppler returns, said correlation signals including frequencies equal to the difference between said stored Doppler returns and the reference signal modulating said read electron beam; filter means coupled to said photomultiplier means and adapted to pass said difference frequencies; detecting means coupled to said filter means for developing a signal representative of the envelope of said correlation signal passed by said filter; integrating means for developing an integral of said detected signal; a display scanning tube having an electron beam and coupled to said sweep generating means for deflecting said display electron beam in the range dimension in accordance with said second sweep signal, said display scanning tube also further coupled to said integrating means for intensity modulating the display electron beam in accordance with said integral; and a movable map film mounted adjacent to said display scanning tube and coupled to said intermediate storage film, said movable map film being adapted to move at a speed proportional to said intermediate storage film and responding to energy in the form of intensity modulated light emitting from said display electron beam to provide a focused indication of said objects being mapped.

* * * * *